(12) United States Patent
Arif et al.

(10) Patent No.: US 9,116,767 B1
(45) Date of Patent: Aug. 25, 2015

(54) DEPLOYMENT PATTERN MONITORING

(71) Applicant: International Business Machines Corporation, Armonk, NY (US)

(72) Inventors: Muhammad Arif, Raleigh, NC (US); Ann Marie Fred, Davis, CA (US); Rodrigue Mubamba, Ottawa (CA); Dermot M. Walsh, Glanmire (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/297,713

(22) Filed: Jun. 6, 2014

(51) Int. Cl.
*G06F 9/445* (2006.01)

(52) U.S. Cl.
CPC .................................... *G06F 8/60* (2013.01)

(58) Field of Classification Search
CPC ........................................................ G06F 8/60
USPC ................................................. 717/168–178
See application file for complete search history.

(56) References Cited

U.S. PATENT DOCUMENTS

| | | | | |
|---|---|---|---|---|
| 8,291,378 | B2 * | 10/2012 | Arnold et al. | 717/120 |
| 8,677,317 | B2 * | 3/2014 | Arnold et al. | 717/120 |
| 2007/0271560 | A1 * | 11/2007 | Wahlert et al. | 718/1 |
| 2010/0031247 | A1 * | 2/2010 | Arnold et al. | 717/174 |
| 2012/0192146 | A1 * | 7/2012 | Arnold et al. | 717/105 |
| 2013/0227335 | A1 | 8/2013 | Dake et al. | |
| 2013/0232463 | A1 | 9/2013 | Nagaraja et al. | |
| 2014/0068546 | A1 * | 3/2014 | Balasubramanian et al. | 717/104 |

OTHER PUBLICATIONS

Mikic-Rakic et al., "A Tailorable Environment for Assessing the Quality of Deployment Architectures in Highly Distributed Settings," 2004, Springer-Verlag, p. 1-17.*
Chen et al., "An Architectural Overview of IBM Workload Deployer," IBM Redpaper, Created or Updated on Jul. 5, 2012, 26 Pages, © Copyright IBM Corp. 2012.
Unknown, "Heat," https://wiki.openstack.org/wiki/Heat.
Unknown, "Heat Architecture," openstack cloud software, last updated on Apr. 25, 2014, © Copyright 2012,2013 Heat Developers http://docs.openstack.org/developer/heat/architecture.html.
Unknown, "Integration API," PagerDuty "developer", http://developer.pagerduty.com/documentation/integration/events.
Unknown, "REST API Documentation," PagerDuty "developer", http://developer.pagerduty.com/documentation/rest.

(Continued)

*Primary Examiner* — Qing Chen
(74) *Attorney, Agent, or Firm* — Scott S. Dobson; Diana L. Roberts

(57) ABSTRACT

A computer system can detect a request for status information relating to a particular deployment pattern; query, in response to the request, a deployment pattern registry for deployment configuration information about the particular deployment pattern; test deployment capabilities for the particular deployment pattern by: verifying installation files for the particular deployment pattern are accessible; identifying one or more candidate deployment components for a hypothetical deployment of the particular deployment pattern; installing, on the one or more candidate deployment components, a virtual machine that is configured to test computing resources of the one or more candidate deployment components; and deleting the virtual machine in response to receiving test results regarding the resources of the one or more candidate deployment components. The system can generate a notification in response to detecting a failure in the testing.

10 Claims, 7 Drawing Sheets

(56) References Cited

OTHER PUBLICATIONS

Unknown, "REST Endpoint," VictorOps Knowledge Base, © 2013-2014 VictorOps Inc. http://victorops.force.com/knowledgebase/articles/Integration/Alert-Ingestion-API-Documentation/.

Unknown, "Ways to Integrate with VictorOps," VictorOps Knowledge Base, © 2013-2014 VictorOps Inc. http://victorops.force.com/knowledgebase/articles/Integration/Available-Integrations/.

Mell et al., "The NIST Definition of Cloud Computing," National Institute of Standards and Technology, U.S Department of Commerce, Special Publication 800-145, Sep. 2011.

Arif et al, "Deployment Pattern Monitoring," U.S. Appl. No. 14/467,644, filed Aug. 25, 2014, IBM.

List of IBM Patents or Patent Applications Treated As Related, Aug. 25, 2014.

\* cited by examiner

DEPLOYMENT PATTERN MONITORING

BACKGROUND

The present disclosure relates to monitoring of deployment patterns, and more specifically, to monitoring for future deployment issues with deployment patterns.

Some systems provide a way to easily and repeatedly deploy software applications in a cloud environment. For instance, virtual images and deployment patterns can be used to deploy a set of software components multiple times. A deployment pattern in this context can include a logical description of both the physical and virtual assets of a particular solution and can define their interrelationships. Deployment patterns can provide flexibility and customization options and can define components such as an operating system, virtual machines, applications and additional software solutions. Some deployment patterns can be optimized and constructed for the purpose of supporting a singular workload. Such patterns can often be successfully deployed with little customization, which can provide a direct method for implementing a rapid deployment cycle. Other patterns can be constructed for supporting multiple workloads.

SUMMARY

Embodiments of the present disclosure are directed toward a computer-implemented method for monitoring candidate deployment components. A computer system can detect a request for status information relating to a particular deployment pattern; query, in response to the request, a deployment pattern registry for deployment configuration information about the particular deployment pattern; test deployment capabilities for the particular deployment pattern by: verifying installation files for the particular deployment pattern are accessible; identifying one or more candidate deployment components for a hypothetical deployment of the particular deployment pattern; installing, on the one or more candidate deployment components, a virtual machine that is configured to test computing resources of the one or more candidate deployment components; and deleting the virtual machine in response to receiving test results regarding the resources of the one or more candidate deployment components. The system can generate a notification in response to detecting a failure in the testing.

Certain embodiments are directed toward a system for monitoring candidate deployment components. One or more computer processor circuits can be configured to: detect a request for status information relating to a particular deployment pattern; query, in response to the request, a deployment pattern registry for deployment configuration information about the particular deployment pattern; test deployment capabilities for the particular deployment pattern by: verifying installation files for the particular deployment pattern are accessible; identifying one or more candidate deployment components for a hypothetical deployment of the particular deployment pattern; installing, on the one or more candidate deployment components, a virtual machine that is configured to test computing resources of the one or more candidate deployment components; and deleting the virtual machine in response to receiving test results regarding the resources of the one or more candidate deployment components. The system can be configured to generate a notification in response to detecting a failure in the test results.

According to embodiments, a computer program product includes a computer readable storage medium having program instructions embodied therewith, the program instructions executable by a computer to cause the computer to perform a method includes: detecting a request for status information relating to a particular deployment pattern; querying, in response to the request, a deployment pattern registry for deployment configuration information about the particular deployment pattern; testing deployment capabilities for the particular deployment pattern by: verifying accessibility to installation files for the particular deployment pattern; identifying one or more candidate deployment components for a hypothetical deployment of the particular deployment pattern; installing, on the one or more candidate deployment components, a virtual machine that is configured to test computing resources of the one or more candidate deployment components; and deleting the virtual machine in response to receiving test results regarding the resources of the one or more candidate deployment components. A notification can be generated in response to detecting a failure in the test results.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
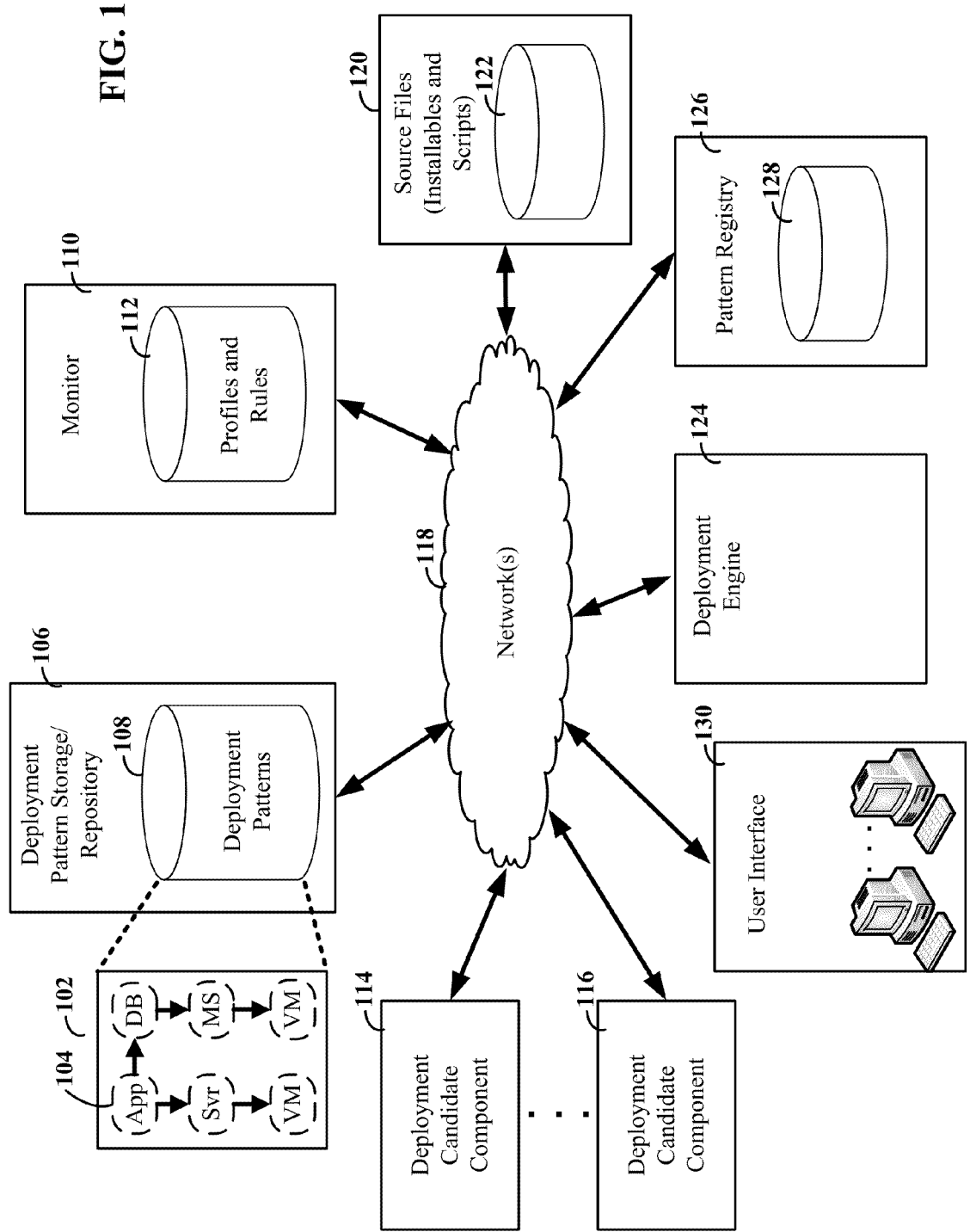
FIG. 1 depicts a system diagram for a system that can monitor deployment patterns, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to deployment patterns for use with cloud computing applications, more particular aspects relate to proactively monitoring for problems with future deployments. While the present disclosure is not necessarily limited to such applications, various aspects of the disclosure may be appreciated through a discussion of various examples using this context.

Embodiments of the present disclosure are directed toward computer-implemented monitoring and reporting functions as they relate to existing deployment patterns and to dependencies relating to candidate deployment components. Particular aspects include proactive monitoring/verification that is effectively decoupled from an actual deployment event, which can be particularly useful for identifying potential issues before there is a need to deploy a new instance of the deployment pattern. As discussed in more detail herein, there can be multiple different checks and monitoring steps that can be carried out. A monitoring system can be configured to perform different levels of monitoring, involving various combinations of these checks and steps, depending upon the particular circumstances. Moreover, the system can be configured to initiate verification of deployment patterns based upon a variety of different triggering events, which can correspond to, or generate, a request for status information about one or more deployment patterns.

According to certain embodiments, the system can receive and detect a request for status information relating to a particular deployment pattern. For example, the request may be a periodic request that is generated with a frequency that corresponds to the relative importance of the particular deployment pattern. The system can then attempt to obtain relevant information about the particular deployment pattern. For example, the system may query a deployment pattern registry that stores deployment configuration information about the particular deployment pattern. This configuration information may include, but is not necessarily limited to, identification of installation files (e.g., binaries), configuration and install scripts, environment specific data (e.g., test environment versus production environment), pattern ownership access rights and hardware component candidates for deployment.

According to some embodiments, the system can be configured to test deployment capabilities for the particular deployment pattern by verifying that identified installation files are accessible for the particular deployment pattern. For instance, the system may be able to detect that one or more installation files have been removed from a corresponding repository, or that the repository is not accessible (e.g., temporarily down, improper access rights or otherwise unavailable).

Consistent with embodiments, the system can also be configured to identify one or more candidate deployment components for a hypothetical deployment of the particular deployment pattern. For example, the system can identify a cloud provider upon which the deployment pattern can be deployed. With respect to physical hardware, the components may include, but are not limited to, storage arrays, computer processors, memory and switches. With respect to applications and software, the components may include various virtual interfaces (e.g., operating systems, hypervisors or storage/database applications) that allow a deployed instance to access the underlying hardware components.

In some embodiments the system can be configured to verify that the identified components exist and are accessible. Various embodiments allow for the system to test for additional problems, some of which may not be readily apparent. For example, a particular component may be available, but there could be a problem with connecting to one or more of the other components. Accordingly, the system can be configured to generate and install a virtual machine on the one or more candidate deployment components. The virtual machine can be configured to test computing resources of the one or more candidate deployment components. In some instances, multiple test virtual machines can configured and deployed. Once the testing is completed, the system can then delete the virtual machine. If a failure is detected in any of the monitoring or testing steps, the system can be configured to generate a notification, which can be provided to a system or individual associated with the particular deployment pattern.

Consistent with various embodiments, the system can be configured to save information useful for determining the source of a problem, such as by creating deployment and error log files, before deleting the virtual machine(s). The system can also be configured to leave the test VM(s) so they can be used to further debug the source of problem. Moreover, the system can be configured to deploy application containers, such as Linux Containers (LXC) and extended by formats like Docker, as part of the test. These containers can be used to deploy test applications, while providing isolation for the application relative to the operating environment (e.g., relative to process trees, network, user ids and mounted file systems). The application containers can be deployed in combination with one or more VM(s), or on their own, depending upon the configuration and settings of the system.

Turning now to the figures, FIG. 1 depicts a system diagram for a system that can monitor deployment patterns, consistent with embodiments of the present disclosure. In various different embodiments, the system can be configured to test a hypothetical deployment of one or more deployment patterns in order to proactively determine problems with future deployments. A monitor module or server 110 can be configured to initiate the testing by interacting with various deployment components of the system. As discussed herein, the various modules and servers can include one or more computer processor circuits and memory storage devices that are specially configured to carry out the related functions.

According to embodiments, the monitor module 110 can be configured to test deployment patterns 102. The deployment patterns 102 can include topology definitions for how elements (or nodes) 104 are deployed within different environments. For example, the nodes 104 could include, but are not necessarily limited to, virtual machines (VM), web (or similar) servers (Svr), software applications and services (App), databases (DB), and database management systems (MS). Other nodes types and configurations are also possible.

Consistent with embodiments, the deployment patterns 102 can describe how to connect to and use pre-existing resources, such as a company's LDAP server or another external service. For example, a script package can be used to establish a connection with an existing LDAP server or other component, instead of putting the component directly into the pattern. In certain pattern protocols, an existing component can be included in a pattern as shared service object that includes instructions for how to connect to the existing component.

Consistent with embodiments, the deployment patterns 102 can be stored in one or more deployment pattern databases 108. A deployment pattern storage server 106 (or software repository server) can control access requests for patterns stored in the deployment pattern database 108. The deployment pattern storage server 106 can allow different systems and modules access to the core patterns over network 118. Network 118 can include, but is not necessarily limited to, local area network(s) (LANs), wide area networks (WANs), the global Internet, proprietary networks, private networks and combinations thereof.

According to embodiments, one or more deployment engines or servers 124 can be configured to deploy patterns to create one or more instances of the deployment patterns. This can include the creation and configuration of various nodes running on deployment components, such as storage devices and arrays, computer processors, memory and switches. Deployment engine 124 can be designed to communicate with the deployment pattern storage server 106. After the deployment engine 124 retrieves deployment patterns from the deployment pattern storage server 106, data stored in the patterns can be used to determine how to configure and initiate an instance of the deployment pattern.

Consistent with various embodiments, one or more pattern registry servers 126 can store information about available deployment patterns in a database 128. In various embodiments, pattern registry server 126 can manage deployment pattern creation, access and availability. In embodiments, the pattern registry server 126 can store metadata about the deployment patterns, such as user access rights to the deployment patterns.

In certain embodiments, one or more source file servers, repositories, or modules 120 (such as a Yellowdog Updater, Modified (YUM) repository or a webserver) can store installable files and scripts in a database 122. The source files can include binary executables, configuration scripts, data files and other files that are used to instantiate a particular instance of a deployment pattern. In certain environments, some source files can be stored in the deployment pattern storage server 106, and others are stored in one or more other repositories 120.

In embodiments, users can access the deployment patterns through a user interface 130. The user interface 130 can be configured to provide options for creating, modifying, deleting and deploying the various deployment patterns. In some embodiments, the user interface can be configured to provide a notification of a potential problem with a deployment pattern in response to input from monitor server 110. Various embodiments also allow for the user interface 130 to include options for configuring the monitor server 110 (e.g., by selecting a test frequency for particular patterns). The configuration settings can be stored in a profiles and rules database 112.

Consistent with embodiments, the monitor server 110 can be configured to perform proactive verification of deployment patterns in order to identify potential problems with future deployments. As discussed herein, the verification and testing of the deployment patterns can be initiated substantially independent from any actual deployment of the corresponding deployment patterns. This can be particularly useful for identifying potential issues before an instance of the deployment pattern is needed, which may allow a user to correct the problem before the deployment pattern is needed.

As discussed herein, the monitor server 110 can be configured to respond to a request for status information about one or more deployment patterns. This request may be initiated based upon a variety of different trigger events, some of which are discussed in more detail herein. For example, a periodic trigger event could be set to happen at a particular periodicity (e.g., weekly or daily). In other examples, a trigger event could be set to happen in response to the occurrence of a certain event (e.g., the usage of existing deployed instances reaches a certain capacity or a change occurs to a deployment pattern or to a service provider). Other trigger events (e.g., a manual request through user interface 130), and combinations of different types of trigger events, are also possible.

The monitor server 110 can respond to a request by first verifying that the deployment engine 124 will have access to the appropriate files and servers. For instance, the monitor server 110 can retrieve information/metadata about the particular deployment pattern being tested from the pattern registry server 126. Using the retrieved metadata, the monitor server 110 can access further details about the particular pattern from deployment pattern storage 106. The monitor server can also verify that the appropriate files are accessible in the source files server 120. If any of these verifications fail, the monitor server 110 can be configured to log the reason for the failure and provide notification of the same to the appropriate entity. For example, the system can be configured to generate and store log files that describe which test procedures that were completed, attempted and any error codes or events that were detected. In certain embodiments, the notification can be provided through user interface 130, which can be configured to allow access to data stored in the log files.

Various embodiments are directed toward further verification steps that can be carried out by the monitor server 110. For instance, the monitor server 110 can identify deployment candidate components 114, 116 based upon the data obtained from deployment pattern storage server 106 and pattern registry server 126. The monitor server 110 can then determine the status of the deployment candidate components 114, 116. For instance, the monitor server 110 can detect whether or not the deployment candidate components 114, 116 (e.g., an LDAP server) are accessible by attempting to establish a communications link. The monitor server 110 can also be configured to determine whether or not the user owning the deployment pattern has the proper access rights to allow deployment of modules on the deployment candidate components 114, 116.

Consistent with embodiments, one or more different credentials and access rights can be verified. A first verification can be the pattern owner. Another verification can be to verify the credentials that are in the cloud provider or pattern deployment configuration information (such as secure shell (SSH) keys or access keys to cloud providers). The system can also be configured to verify credentials built in to the images or script packages, such as SSH keys or privacy-enhanced mail (PEM) keys. The monitoring system could check one or more of these (or other) types of credentials automatically, e.g., pattern owner and pattern configuration information.

In certain embodiments, the monitor server 110 can be configured to test more detailed aspects of the deployment candidate components 114, 116. For instance, a virtual machine can be created that is designed to test computing resources expected to be used by a deployed module of the particular deployment pattern. This virtual machine can be generated using information gleaned from the configuration scripts stored in the source files server 120. As non-limiting examples, the virtual machine can be configure to establish connection with resources such as databases, other deployment candidate components, remote servers, existing instances of deployed patterns, memory, processors and combinations thereof. Consistent with embodiments, the virtual machine can be configured to have a small footprint (e.g., only consume a small amount of resources from the deployment candidate component). Upon completion of the test by the virtual machine, the test results can be reported back and the virtual machine can be deleted. In some embodiments, the virtual machine can be left for future use (e.g., to debug the source of the failed test results). Depending upon the particulars of a deployment pattern, the monitor server 110 can be configured to create and deploy multiple virtual machines for the same deployment pattern.

Figure 2:
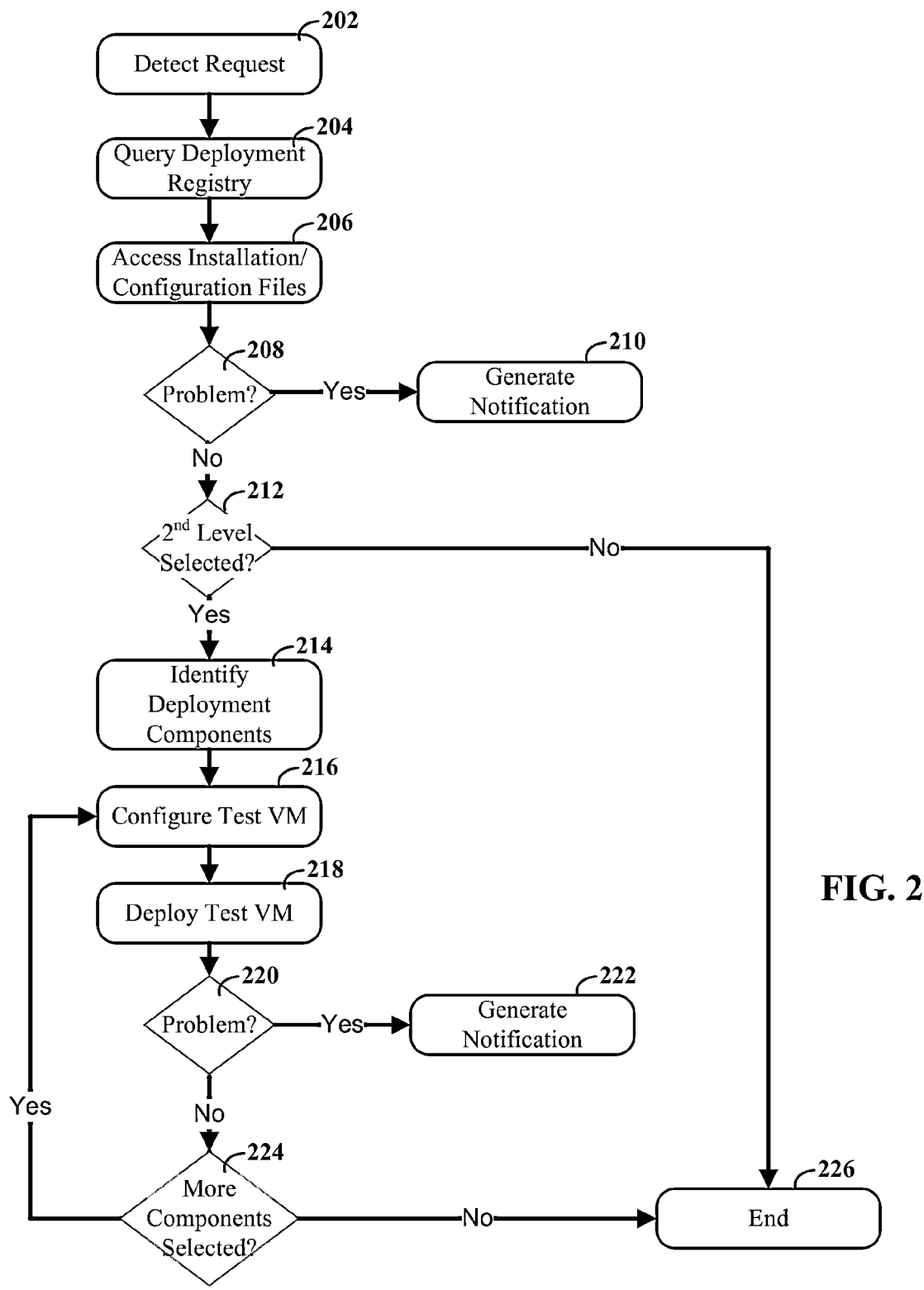
FIG. 2 depicts a flow diagram for monitoring deployment patterns, consistent with embodiments of the present disclosure.

FIG. 2 depicts a flow diagram for monitoring deployment patterns, consistent with embodiments of the present disclosure. A monitor server, such as the server discussed in connection with FIG. 1, can be configured to receive or detect a request for information relating to a deployment pattern, as shown by block 202. This request can be generated in response to a variety of trigger events, some of which are discussed in more detail herein. In response to the request, the monitor server can query a deployment register to obtain metadata regarding the deployment pattern indicated by the request, as shown by block 204. In certain instances, this metadata can identify locations where additional information about the particular deployment pattern can be obtained.

The monitor server can be configured to access various data relating to the installation and configuration of the deployment pattern, as depicted in block 206. For example, the monitor server can access a deployment pattern server and database that includes topology definitions for the various nodes of the deployment pattern. The monitor server can also access files from a source file repository/server. These files can include system images, executable install (binary) files, and configuration scripts. The monitor server can determine whether or not there is a problem by determining whether the required data is accessible and whether the proper access rights exist, per block 208. If a problem is detected, then the monitor server can generate a notification, per block 210.

The monitor server can be configured to generate the notification using a variety of different communication paths. For instance, an electronic message (e.g., email, instant message or cellular text message) can be directly sent to one or more responsible individuals as indicated in a profile database that links the responsible individuals to the deployment patterns. In some instances, the notification can be displayed on a graphical user interface (GUI) that is used to create, modify and/or deploy deployment patterns.

In certain instances, the monitor server can use an application program interface (API) to send the notification to a more sophisticated system for processing and notification generation. This may include, for example, setting an error flag that is checked when the deployment pattern is accessed by the API. Non-limiting examples of notification systems include incident management systems that are designed to contact responsible individuals using email, short message service (SMS), audio telephone calls and other contact methods. This can be particularly useful for instances where the deployment pattern has a high visibility, is part of an important service or may otherwise benefit from fast and efficient notification.

If no problem is detected, the monitoring server can determine whether or not an additional second level of testing has been selected for the particular deployment pattern, per block 212. For instance, an owner of the deployment pattern can be presented with an interface that presents options for selecting of different levels of testing for different deployment patterns. As an example, an owner may indicate whether or not a virtual machine should be created for test deployment. If no additional testing is selected, then the process can end, per block 226.

If additional testing is selected, then the process can identify one or more candidate deployment components, per block 214. This can include identifying a cloud provider and relevant resources for testing. The monitor server can then configure one or more test virtual machines (VM), per block 216, for deployment on one or more of the identified candidate deployment components. This can include the inclusion of configuration actions derived from scripts stored on a source file server. The monitor server can then deploy the test VM on the corresponding component(s), per block 218. If a problem is detected, the VM can be configured to report the problem back to the monitor server, which can generate an appropriate notification, per block 222. For example, the deployment engine can runs scripts on the VM, and receive return codes back from the scripts. If the return code indicates an error, the deployment engine and monitor can link the error back to the originating deployment pattern being tested.

If no problem is detected, then the monitor server can determine whether or not additional test components have been selected for testing, per block 224. If not, then the process can end per block 226. Otherwise, a new test VM can be configured, per block 216, and the process can repeat until all selected components have been tested or a problem is detected.

Consistent with embodiments, the pattern can describe the order in which VMs are to be deployed and configured during a normal deployment. The monitoring system can be configure to generate corresponding test VMs that are then deployed in the same order. Although the process of FIG. 2 shows serial deployment of test VMs, deployment patterns may specify that multiple VMs be deployed in parallel. The installation of software and configuration of the VMs may still have a specified order. The monitoring system can also deploy test VMs in a parallel manner, and then install and configure the test VMs in the specified order.

Figure 3:
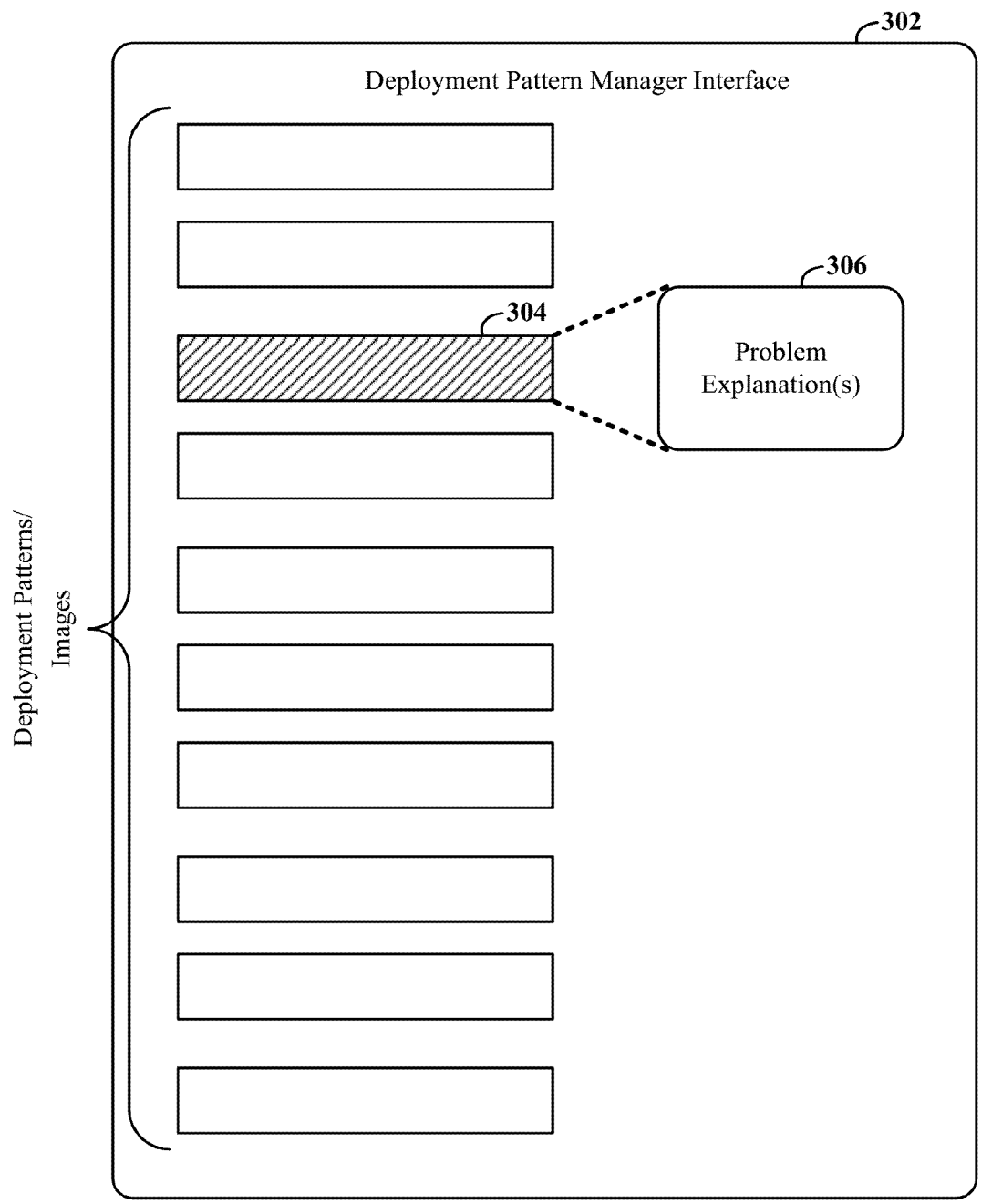
FIG. 3 depicts a deployment pattern manager interface, consistent with embodiments of the present disclosure.

FIG. 3 depicts a deployment pattern manager interface, consistent with embodiments of the present disclosure. The deployment pattern manager interface 302 can be presented to individuals that manage deployment patterns. For example, the deployment manager interface can be designed to provide a graphical user interface that allows an individual to select existing deployment patterns for deployment, modification, creation or deletion. Information about the deployment patterns can be displayed in response to selection. In certain embodiments, additional information can be provided as part of the interface, such as the status of previously deployed instances. Various embodiments also use an API to generate a call to another tool that is designed to handle notifications.

As shown in the interface, a notification can be provided for a deployment pattern 304 that has failed one or more proactive monitoring tests. For example, the deployment pattern 304 can be highlighted with a visual indicator. In various embodiments, the deployment pattern manager interface can also provide details that explain the source of problem, per 306, such as by identifying the specific test that failed. The individual can then attempt to determine an appropriate solution for the problem.

In certain embodiments, a deployment management system includes an API that allows a user to query the deployment patterns. Various embodiments allow for the query values returned by the pattern to be modified to include an error message or error code. This can include the use of an error flag that returns the error message or code when the deployment pattern is queried. This allows for an error notification to be provided when the pattern registry is being accessed automatically by a program (e.g., instead of via a graphic user interface).

Figure 4:
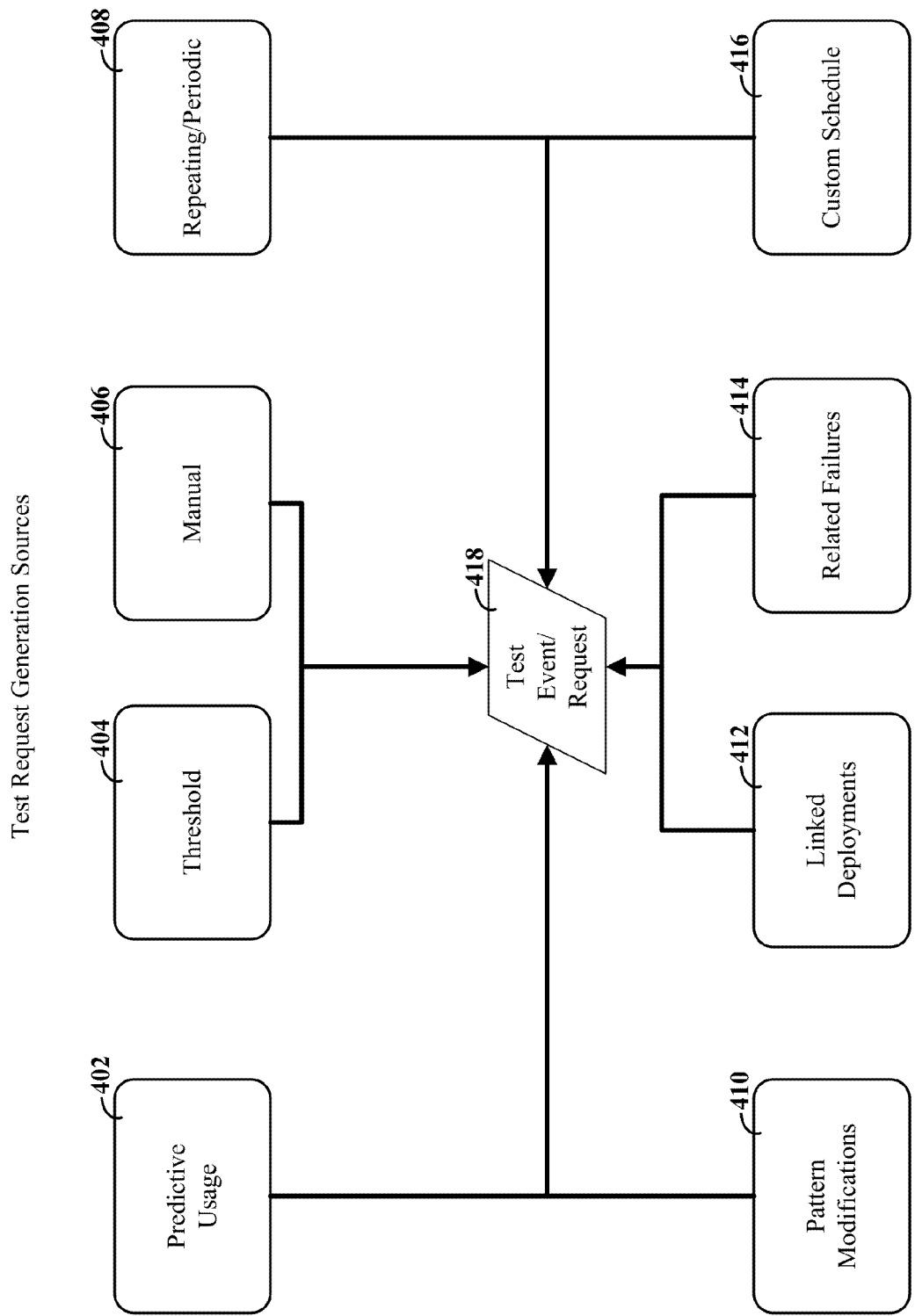
FIG. 4 depicts a flow diagram of different triggering events for generating a request, consistent with embodiments of the present disclosure.

FIG. 4 depicts a flow diagram of different triggering events for generating a request, consistent with embodiments of the present disclosure. Consistent with various embodiments, the monitoring and testing of deployment patterns can be carried out in response to a variety of different events or triggers. In response to the triggers, a test event or request 418 can be generated. A monitor server can be configured to initiate monitoring for one or more patterns in response to satisfaction of a trigger event.

Consistent with embodiments, the trigger event can be based upon the output from a predictive analysis algorithm (402) that is designed to generate a test request based upon a set of input parameters relating to future deployments of the deployment pattern. For instance, a deployment pattern may have a history of being deployed when use of computing resources (e.g., storage usage) by existing deployments reaches a certain level. The predictive analysis algorithm could be configured to identify usage patterns that suggest that the storage usage will exceed the level in the near future and then generate a test request in response. Other parameters are also possible for use by the algorithm. Consistent with certain embodiments, the predictive analysis algorithm (402) can use machine learning techniques, such as training the algorithm based upon past usage history.

Various embodiments are directed toward the use of threshold triggers (404). For instance, the trigger event can be configured to generate a test request when a website traffic corresponding to a deployed instance hits a certain level. In some embodiments, the trigger threshold can be set lower than a threshold that would result in automatic deployment of another instance. In this manner, the monitor server can proactively test for error conditions before a new deployment instance is desired.

Other embodiments relate to trigger events based upon manual input (406). For example, a user interface, such as the deployment pattern manager interface 302, may provide options to request that a test be carried out for one or more patterns. An individual can select a deployment pattern for such testing, and the monitor server can begin a monitor and test procedure in response.

Certain embodiments allow for repeating or periodic trigger events (408) to be setup. For instance, the trigger event for a particular pattern could be set to run periodically every month, week or day. The system can also be configured to assign different rates to patterns based upon their importance, susceptibility to failure, frequency of deployment or other considerations. The trigger event timing can also be designed to repeat at irregular intervals, such during only as specific months or weeks of the year.

Embodiments are directed toward trigger events that are based upon modifications being made to deployment patterns (410). When a pattern is modified, the changes may result in new requirements that have not previously been tested by the monitor server. For instance, a modification may add a new resource or change how a connection is established between components. Accordingly, a test request can be generated when a deployment pattern is updated or modified. In some embodiments, the test request can be generated in response to specific types of modifications, such as when changes are made to the configuration scripts.

Various embodiments allow for trigger events that relate to deployments of related deployment patterns (412). For example, the deployment of a first deployment pattern may indicate that one or more other deployment patterns are likely to be deployed in the near future. A trigger event can be set to generate a test request whenever the first deployment pattern is deployed.

Certain embodiments are directed toward trigger events that are based upon problems or failures detected with other deployment patterns (414). As an example, the trigger event can be designed based upon groupings of deployment patterns that have dependencies on the same set of candidate deployment components. When a test of a first deployment pattern indicates a potential issue with a particular candidate deployment component, a test request can be generated for deployment patterns grouped or associated with the particular candidate deployment component. Thus, if a virtual service provider becomes unavailable, the monitor server can test deployment patterns that may be affected and then generate error notifications based upon the test results.

According to embodiments, a trigger event can be based upon a customized schedule (416). For example, an individual may provide a schedule that has specific times for testing to be carried out.

Embodiments of the present disclosure allow for the use of multiple different trigger events in various combinations. As a non-limiting example, a periodic trigger event could be set at a certain frequency (408) while a second trigger event could be set based upon a threshold (404). More complex combinations are also possible, such as a threshold trigger event that is only activated if a test has not been conducted within a certain time period (e.g., only if no test has been conducted within the past month). Another, non-limiting example, is a periodic test that can be setup using a timer set to a particular frequency. The timer can be reset upon occurrence of a test due to another trigger event, or successful deployment of an instance of the particular deployment pattern associated with the timer. Thus, a test can be run (or a successful deployment can occur) no less often that at the particular frequency.

Consistent with embodiments, a test or actual deployment may successfully complete after an error has been detected. This may happen if a user fixes a problem, if the problem is only temporary in nature, or for other reasons. Once a pattern has been tested or deployed successfully, whether that deployment was an automated or a manual deployment, the monitor system can be configured to automatically clear (or remove) the error notification for the pattern. Various embodiments also allow for manual clearing of the error notification (e.g., based upon a user successfully fixing the problem).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
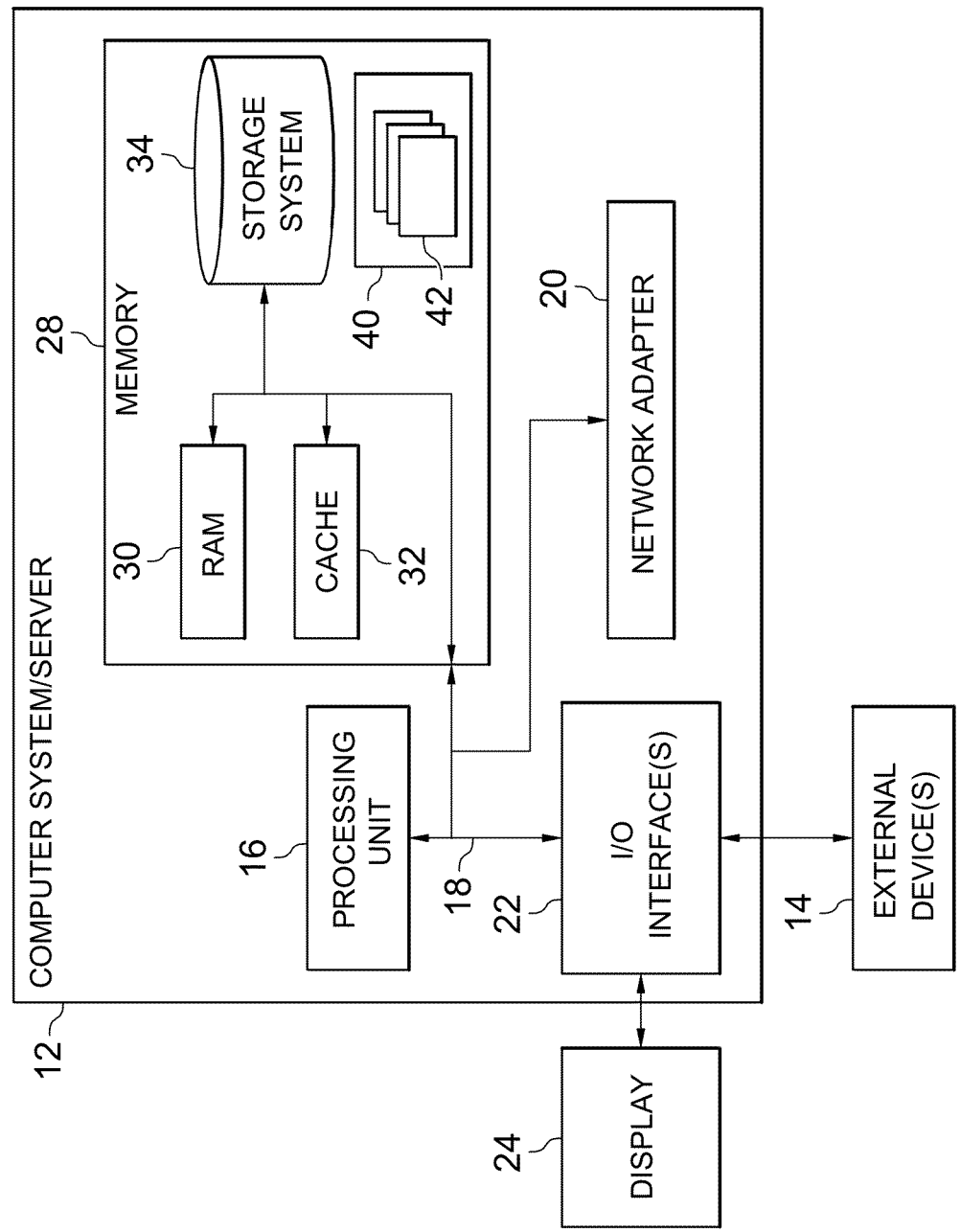
FIG. 5 depicts a cloud computing node, according to embodiments of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
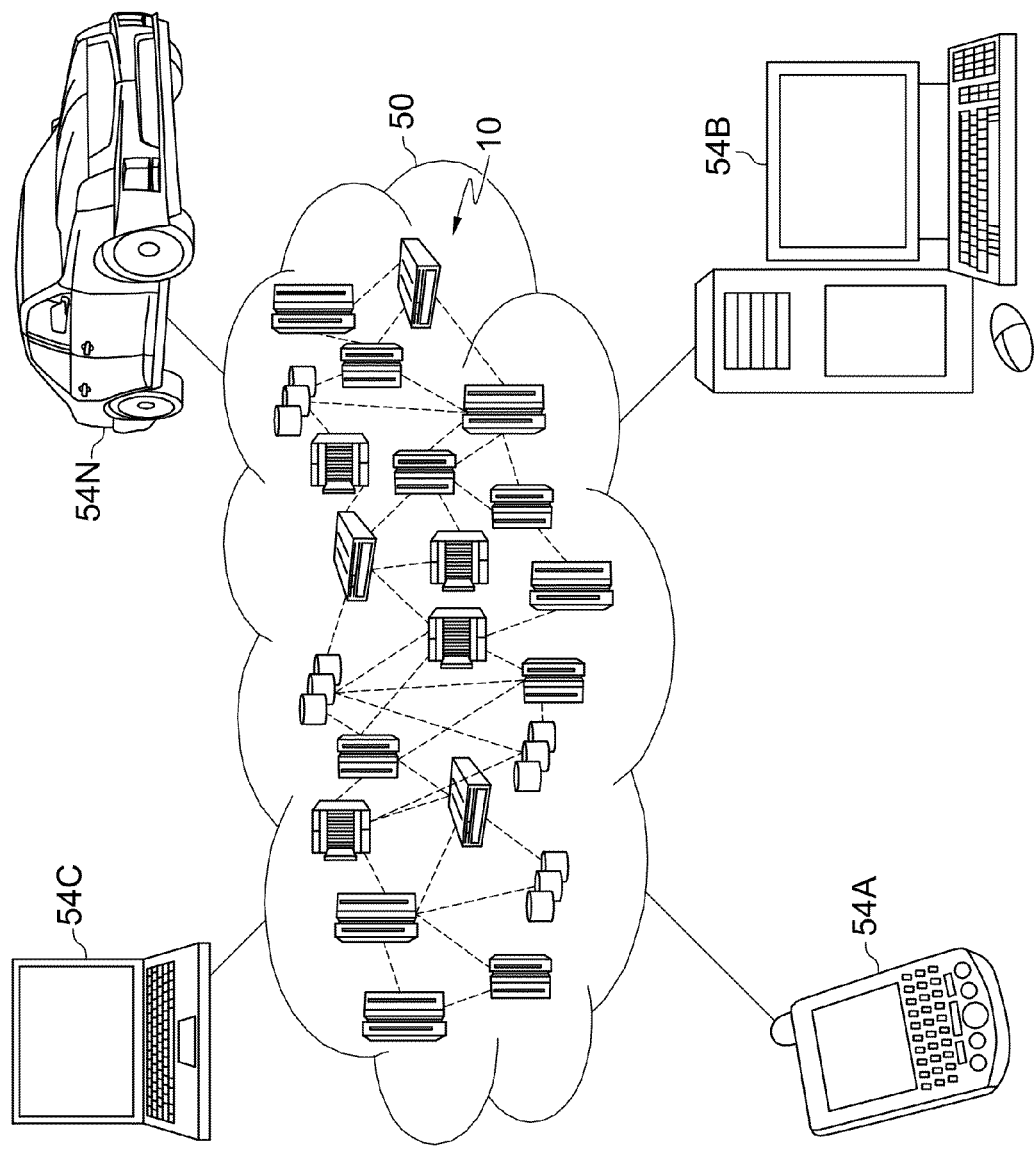
FIG. 6 depicts a cloud computing environment, according to embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
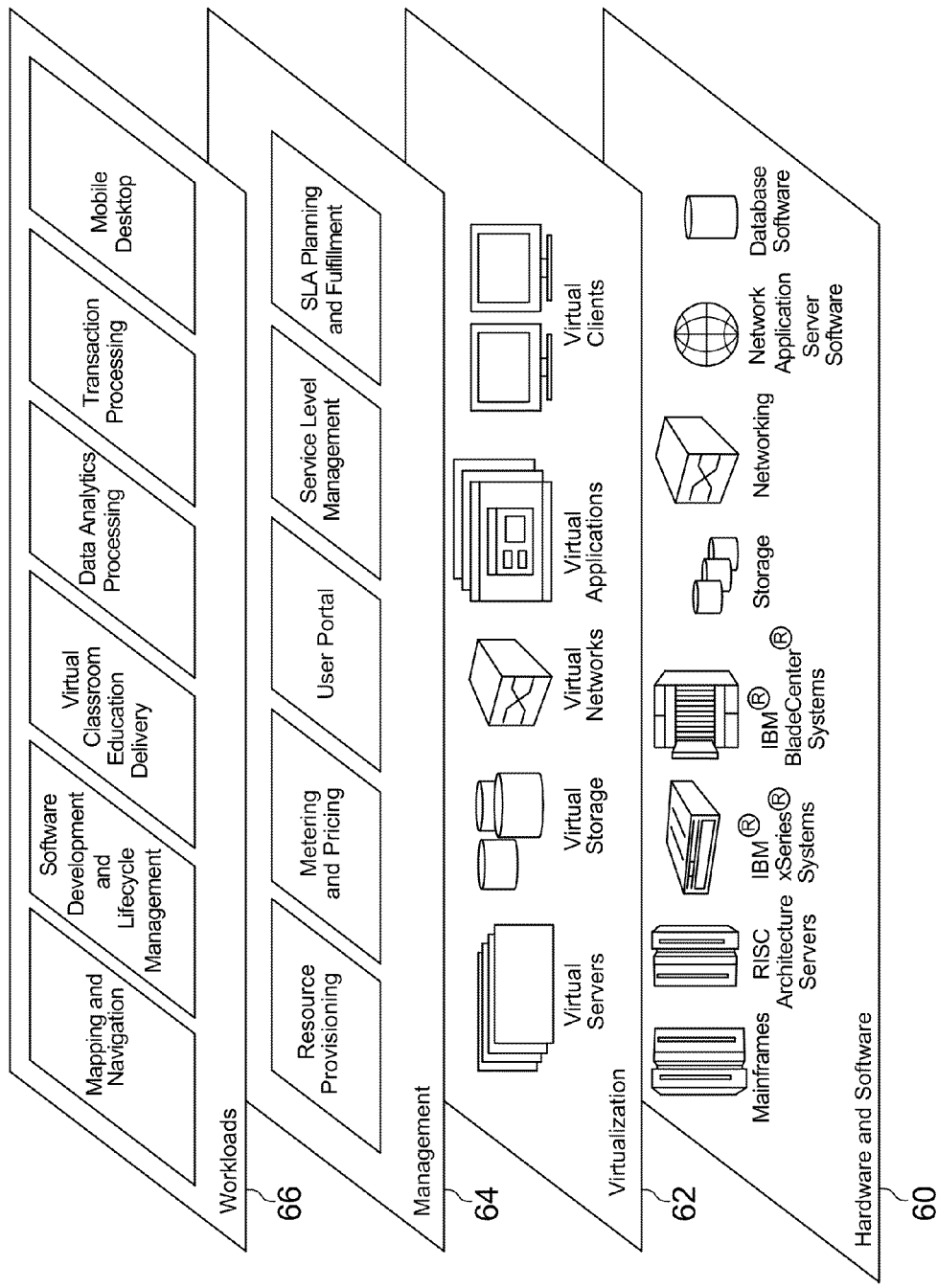
FIG. 7 depicts abstraction model layers, according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients. Various aspects of the present disclosure are directed toward monitoring the status of deployment components within the virtualization layer 62 using deployment patterns, as discussed in more detail herein.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for monitoring candidate deployment components, the system comprising:
   one or more computer processor circuits configured to:
      detect a request for status information relating to a particular deployment pattern;
      query, in response to the request, a deployment pattern registry for deployment configuration information about the particular deployment pattern;
      test deployment capabilities for the particular deployment pattern by:
         verifying that installation files for the particular deployment pattern are accessible;
         identifying one or more candidate deployment components for a hypothetical deployment of the particular deployment pattern;
         installing, on the one or more candidate deployment components, a virtual machine that is configured to test computing resources of the one or more candidate deployment components; and
         deleting the virtual machine in response to receiving test results regarding the computing resources of the one or more candidate deployment components; and
      generate a notification in response to detecting a failure in the test results.

2. The system of claim 1, wherein the one or more computer processor circuits are further configured to:
   periodically generate the request for status information;
   generate log files that include the test results; and
   include data from the log files in the notification.

3. The system of claim 1, wherein installing the virtual machine includes running scripts that test connections to computing resources identified in the deployment configuration information.

4. The system of claim 1, wherein the one or more computer processor circuits are further configured to verify that an owner of the particular deployment pattern has access rights that allow deployment of the particular deployment pattern.

5. The system of claim 1, wherein the one or more computer processor circuits are further configured to set a trigger event that is based upon parameters of deployed instances of the particular deployment pattern.

6. The system of claim 5, wherein the parameters include usage of computing resources by the deployed instances of the particular deployment pattern.

7. The system of claim 1, wherein the notification includes a visual indicator on a graphical user interface that allows users to manage deployment patterns.

8. The system of claim 1, wherein the notification includes an error flag that is accessed in response to queries for the particular deployment pattern.

9. The system of claim 1, wherein the notification includes an error code of a remote notification tool.

10. A computer program product comprising a computer readable storage medium having program instructions embodied therewith, the program instructions executable by a computer to cause the computer to perform a method comprising:
   detecting a request for status information relating to a particular deployment pattern;
   querying, in response to the request, a deployment pattern registry for deployment configuration information about the particular deployment pattern;
   testing deployment capabilities for the particular deployment pattern by:
      verifying that installation files for the particular deployment pattern are accessible;
      identifying one or more candidate deployment components for a hypothetical deployment of the particular deployment pattern;
      installing, on the one or more candidate deployment components, a virtual machine that is configured to test computing resources of the one or more candidate deployment components; and
      deleting the virtual machine in response to receiving test results regarding the computing resources of the one or more candidate deployment components; and
   generating a notification in response to detecting a failure in the test results.

* * * * *